US007165219B1

(12) United States Patent
Peters et al.

(10) Patent No.: US 7,165,219 B1
(45) Date of Patent: Jan. 16, 2007

(54) MEDIA COMPOSITION SYSTEM WITH KEYBOARD-BASED EDITING CONTROLS

(75) Inventors: Eric C. Peters, Carlisle, MA (US); Joseph H. Rice, Arlington, MA (US)

(73) Assignee: Avid Technology, Inc., Tewksbury, MA (US)

( * ) Notice: Subject to any disclaimer, the term of this patent is extended or adjusted under 35 U.S.C. 154(b) by 1381 days.

(21) Appl. No.: 09/645,871

(22) Filed: Aug. 23, 2000

Related U.S. Application Data

(63) Continuation of application No. 09/489,330, filed on Jan. 21, 2000, now abandoned, which is a continuation of application No. 08/873,577, filed on Jun. 12, 1997, now Pat. No. 6,018,337, which is a continuation of application No. 08/045,646, filed on Apr. 9, 1993, now abandoned, which is a continuation-in-part of application No. 07/866,829, filed on Apr. 10, 1992, now Pat. No. 5,355,450.

(51) Int. Cl.
*G11B 27/00* (2006.01)
(52) U.S. Cl. .................................................. 715/716
(58) Field of Classification Search ................ 345/773, 345/168, 812, 163, 716, 723, 731, 590, 620, 345/621, 623, 624, 725; 715/837, 835, 840, 715/846, 716, 725, 812, 831, 723, 773, 731
See application file for complete search history.

(56) References Cited

U.S. PATENT DOCUMENTS 5,202,961 A * 4/1993 Mills et al. .................. 345/720
5,237,648 A * 8/1993 Mills et al. .................. 345/723
5,598,527 A  1/1997 Debrus et al. ............... 345/173
5,995,093 A * 11/1999 Lambourne et al. ......... 345/716
6,115,037 A * 9/2000 Sumiyoshi et al. .......... 345/726
6,118,444 A * 9/2000 Garmon et al. .............. 345/723

OTHER PUBLICATIONS

Mitsubishi, Installation and Operation Manual ("Mitsubishi Owner Manual"), 1990, Mitsubishi Corporation, pp. 1-2.*
"A Sound Editor's Guide to Lightworks Editing Systems," John Portnoy et al, 1st Edition, Lightworks Editing Systems, 1996.
"Avid/1 Media Composer User Manual Books I & II Beta Version" Avid Technology, Inc. 1989.
"Avid/1 Media Composer User Manual Book III Beta Version" Avid Technology, Inc. 1989.
"Avid/1 Media Composer User's Guide Version 2.0" Avid Technology, Inc. 1990.
"CMX 6000 Disk-Based Audio And Video Editing System," C. Hardman, International Broadcast Engineer, vol. 18, p. 37, Mar. 1987.

(Continued)

*Primary Examiner*—Kristine Kincaid
*Assistant Examiner*—Thanh Vu
(74) *Attorney, Agent, or Firm*—Kristofer E. Elbing

(57) ABSTRACT

Method and apparatus for selecting samples for presentation on an output device, such as a display or speaker, from a sequence of stored media samples, such as audio or video information. Position information is received from a pointing device, such as a mouse, and translated into direction and magnitude information. A second sample is then retrieved based on this position and magnitude information. This method may be used to implement jog or shuttle controls for a media composer, which may be provided with simulated "inertia" for ease of use.

52 Claims, 8 Drawing Sheets

OTHER PUBLICATIONS

"CMX 6000" (4-page product brochure), Mar. 1988.
"CMX 6000" (5-page product brochure), Mar. 1987.
"Lightworks Operating Manual," Issue 1, O.L.E. Limited, Jan. 1992.
"The CMX 6000 Manual Supplement," Version 2.2, Michael Rubin, Jun. 1, 1989.
"User's Guide for the EMC2 Digital Editor Version 4.00" Editing Machines Corporation, 1992.
"User's Guide: 1, Editing on the Media Composer," Avid Technology, Inc., 1991.
"User's Guide: 2, Advancing Editing," Avid Technology, Inc., 1991.
"Video Tape Editing Systems," International Broadcast Engineer, vol. 19, No. 22, p. 44-46, 48, Dec. 1988.
"Video Editing and Post-Production: A Professional Guide", 2nd edition, Gary H. Anderson, Knowledge Industry Publications, Inc., 1988, pp. 61-84.
"Videotape Editing, A Postproduction Primer", 2nd edition, Steven E. Browne, Focal Press, 1993, pp. 3-12, 189-197.
"Harry Operator's Manual Reference (2003-57-008 A)", Quantel Limited, 1990.
"Technical Manual for Universal 6/8 Editing Table", KEM Elektronik Mechanik GMBH (applies at least in part to systems delivered in 1972).

* cited by examiner

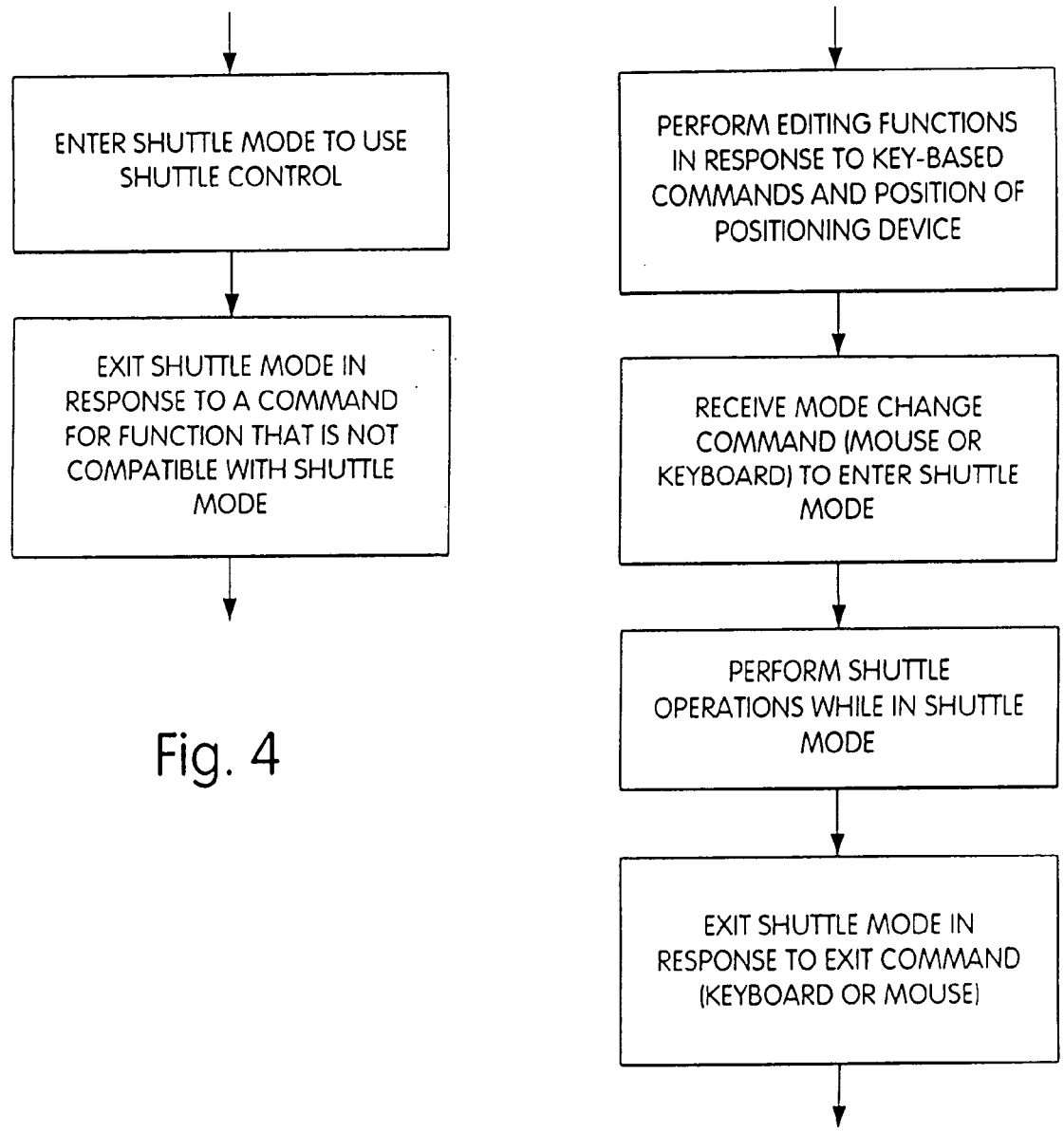

MEDIA COMPOSITION SYSTEM WITH KEYBOARD-BASED EDITING CONTROLS

CROSS REFERENCE TO RELATED APPLICATIONS

This application is a continuation of Ser. No. 09/489,330, Jan. 21, 2000 now abandoned, which is a continuation of Ser. No. 08/873,577, Jun. 12, 1997, U.S. Pat. No. 6,018,337, which is a continuation of Ser. No. 08/045,646, Apr. 9, 1993 now abandoned, which is a continuation-in-part of Ser. No. 07/866,829, Apr. 10, 1992, U.S. Pat. No. 5,355,450, all of which are herein incorporated by reference.

FIELD OF THE INVENTION

The invention relates to the display of sequentially stored samples under the control of a pointer and/or keyboard, and more particularly, to the use of a mouse and/or keyboard as a jog or shuttle control for computer-based video and audio composition.

BACKGROUND OF THE INVENTION

It is known to provide on a media player, such as a video tape recorder, a jog and/or shuttle knob. A shuttle knob allows the operator of the media player to adjust the speed of the player in either a forward or reverse direction. A jog control allows the user to move in forward and reverse directions through the medium on a still frame by frame basis. Examples of prior art jog and shuttle controls include levers, knobs, concentric knobs, and knobs that change function when pressed upon axially or when another switch is pressed.

A common system is a three-button system, in which the user places three of his or her fingers on three buttons. The outer two fingers control the forward and reverse shuttle operations, which are much like fast forward scan and rewind scan buttons on a video tape recorder, except that multiple presses on the outer buttons in shuttle mode result in proportional increases in shuttling speed. For example, three presses will cause shuttling to take place at triple the shuttling speed. The central button is a stop button, and when it is held down, the outer buttons act as forward and reverse jog controls.

In computer-based media composition systems, a visual representation of a shuttle or jog control may be displayed and manipulated with a mouse. For example, an image of a slider or a film strip may be presented to the user. The user may then click on the slider with the mouse and drag the slider to perform either shuttle or jog operations. For example, the Quantel Harry system, available from Quantel Systems, Inc. of England, uses this type of metaphor. Generally, however, these systems require the user to be watching the screen so that they may locate the mouse pointer in a proper position on the slider.

SUMMARY OF THE INVENTION

In general, the invention features selecting samples for presentation on an output device, such as a display or speaker, from a sequence of stored media samples, such as audio or video information. Position information is received from a pointing device, such as a mouse, and translated into direction and magnitude information. A second sample is then retrieved based on this position and magnitude information. This method may be used to implement jog or shuttle controls for a media composition system, which may be provided with simulated "inertia" for ease of use.

A media composition system according to the invention has the advantage of convenience and efficiency for the user. The user may perform composition operations using the pointing device and, without removing his or her hand from the pointing device, move to the next location on the medium to be composed. The user may also do so without looking at a control screen at all; he or she need only look at the material to be composed. These capabilities are provided inexpensively in a commonly-available pointing device, which may already be a part of the user's composing system. Also, the added inertia in both jog and shuttle modes, and playback speed limit in shuttle mode may prevent the user from getting lost in the material to be composed.

BRIEF DESCRIPTION OF THE DRAWINGS

For a better understanding of the present invention, together with other and further objects, advantages and capabilities thereof, reference is made to the accompanying drawings, which are incorporated herein by reference and in which:

FIG. 4 is another exemplary flowchart illustrating operation of a workstation portion such as the one shown in FIGS. 1 and 2;

FIG. 5 is a further exemplary flowchart illustrating operation of a workstation portion such as the one shown in FIGS. 1 and 2;

DESCRIPTION OF THE PREFERRED EMBODIMENT

Figure 1:
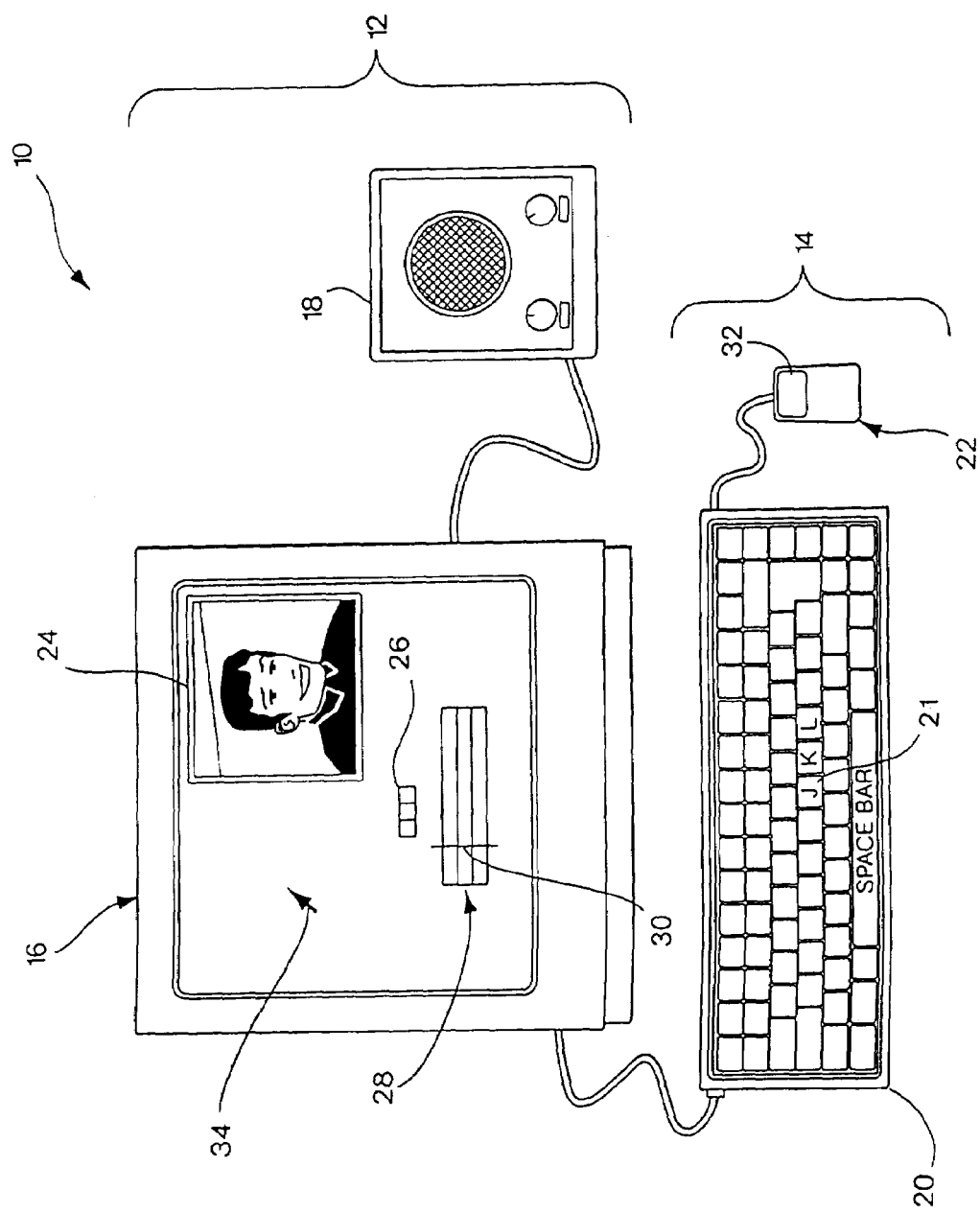
FIG. 1 presents a media composing workstation portion of a media composing system according to the invention.

Referring to FIG. 1, an exemplary media composition workstation according to the invention includes a computer output system 12 and computer input system 14. The output system may include one or more computer monitors 16 and one or more speakers 18. The input device may include a keyboard 20 and a pointing device 22, such as a mouse with one or more buttons 32. The display presented to the user on the monitor may be divided into a window 24 for variable speed playback, on-screen scrub controls 26, a timeline display 28, and a timeline position indicator 30.

Figure 2:
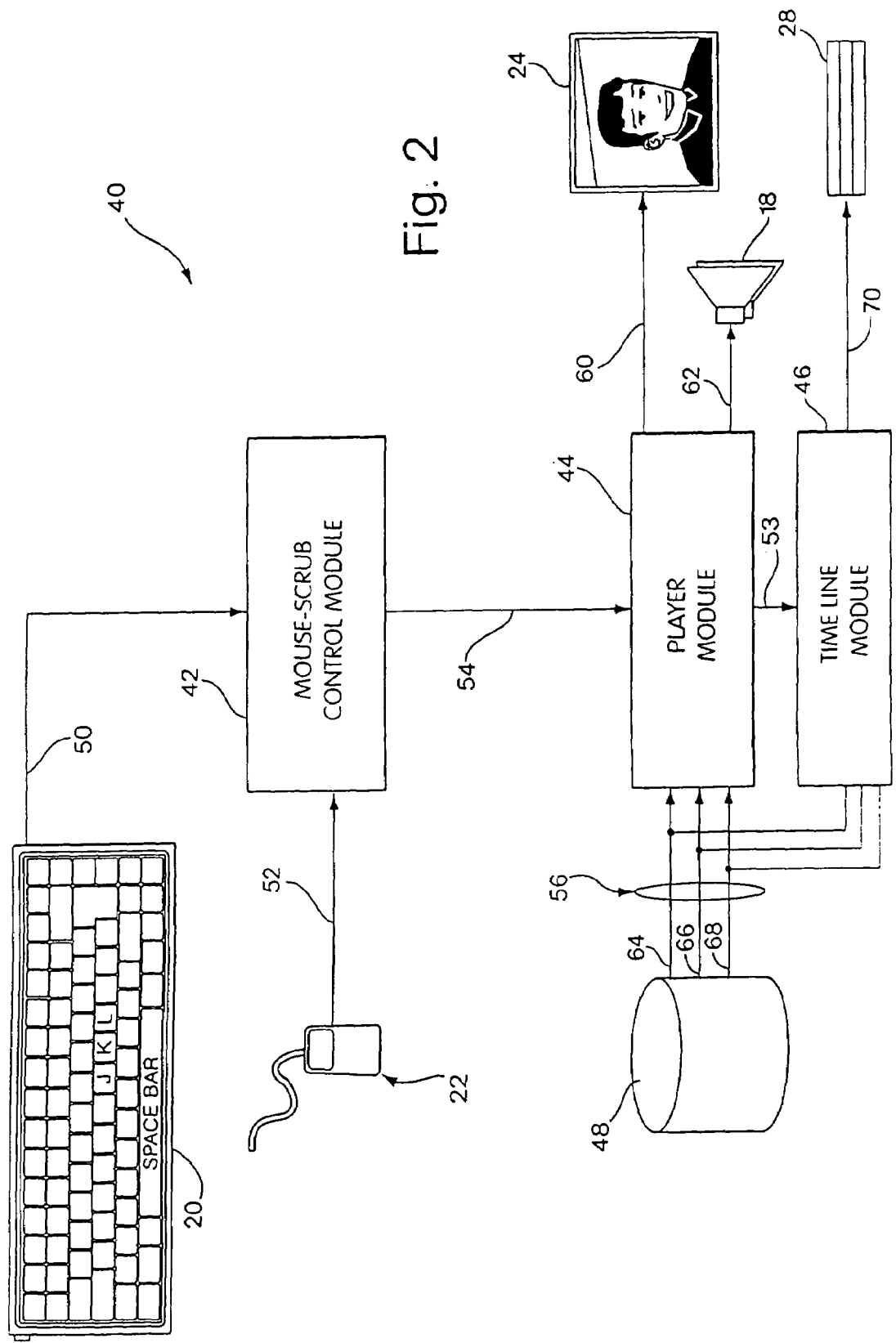
FIG. 2 is a system block diagram of the media composing system of FIG. 1.
Figure 3:
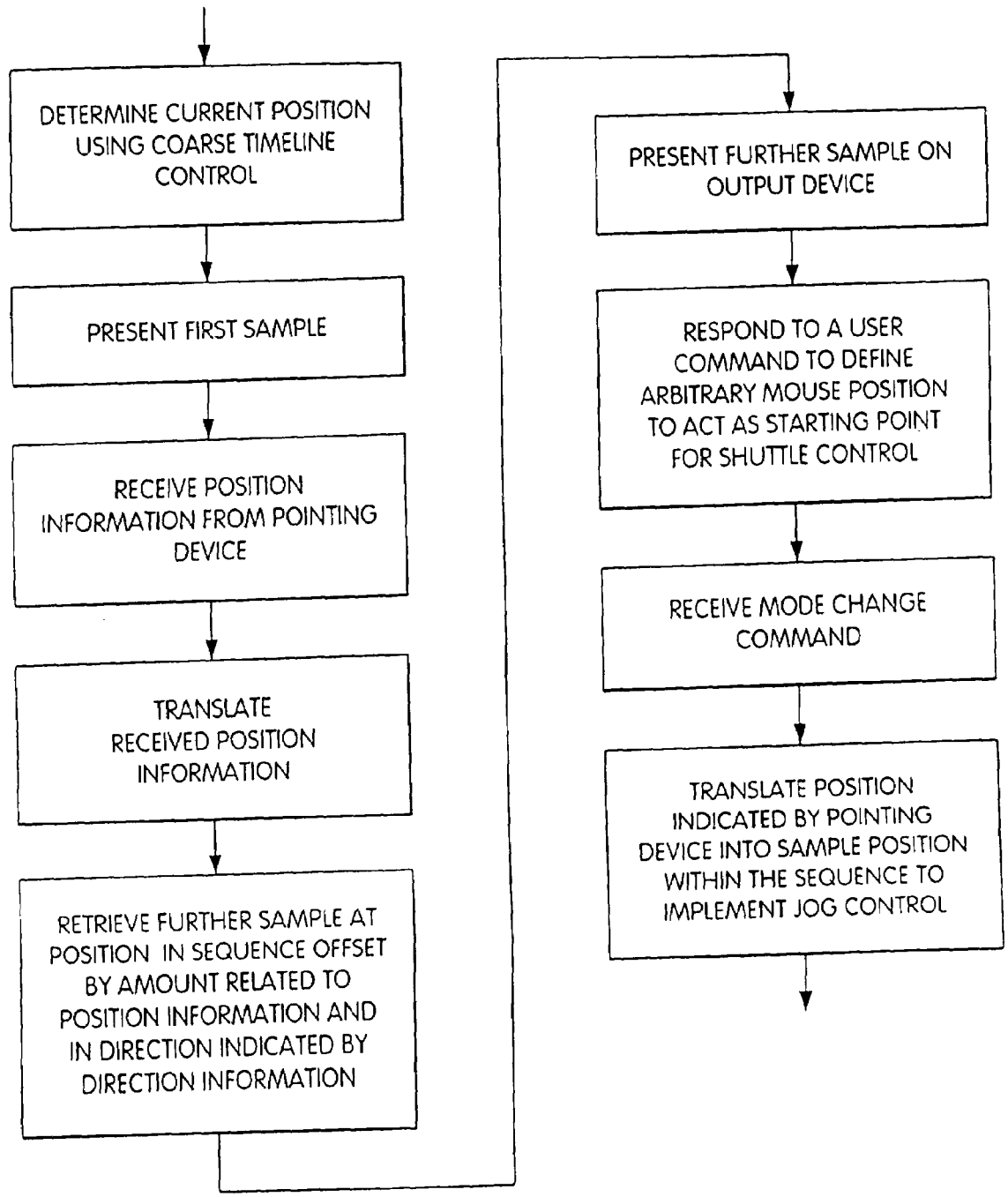
FIG. 3 is an exemplary flowchart illustrating operation of a workstation portion such as the one shown in FIGS. 1 and 2.

Referring to FIG. 2, a media composing system 40 according to the invention may also comprise a mouse/scrub control module 42, a player module 44, a timeline module 46, and storage 48. The mouse/scrub control module is connected to the keyboard via a data path 50 and to the pointing device by another data path 52. The player module 44 is connected to the mouse/scrub control module via a further data path 54.

The player module is also connected to receive information from the storage 48 via a bus 56, which may comprise several data lines 64, 66, 68. These data lines may be dedicated to different synchronized media channels, such as video and audio channels, The bus 56 is further routed to the timeline module 46, which also receives data from the player module via a data path 53. The player module may provide information to the moving picture window 24 via a picture information path 60, and may provide synchronized sound information to the speaker via a sound information data path 62. The timeline module supplies information to the timeline display 28 via a timeline information path 70.

It is observed that the routing of data and information may differ from the block diagram in an actual implementation. For example, the moving picture window and timeline display may be displayed on the same monitor and therefore share a data line. The pointer data might also be routed through the keyboard on its way to the mouse/scrub module or the keyboard might not be needed at all. Furthermore, the invention herein is applicable to composition operations on sound alone, and therefore the displays may not be necessary. Alternatively, the operations may be performed on images alone, making speakers unnecessary.

The pointing device 22 may be one of several general purpose pointing devices available for computers. It may be a mouse supporting one or more buttons 32, or it may be a trackball, a light pen, a digitizing pad, touch pad, touch screen or the like. These types of pointing devices are commonly used to position a cursor on a screen of a computer system, or to receive position dependent data, such as that generated in a manual digitizing operation.

A system according to the invention may be developed using a variety of types of computer systems. In one embodiment, an Apple Macintosh and the "C" computer language were used, but naturally the invention should not be read to be limited to this particular platform. The mouse/scrub control module, player module, and timeline module may be implemented in software and/or hardware and may or may not be contained within the computer system. A software package entitled "Avid Media Composer®", available from Avid Technology, Inc. of Tewksbury, Mass. includes these features. The storage may include a high-speed, high capacity internal magnetic hard disk drive. For further information on computer-based media storage and playback of video and audio information, see Peters et al., "VIDEO AND AUDIO TRANSMISSION SYSTEM AND METHOD", U.S. Pat. No. 5,045,940, issued Sep. 3, 1991, herein incorporated by reference.

Storage 48 contains one or more sequences of image and/or sound samples, and may also contain a sequence of composition information, such as editing and special effect information. The images may be stored in compressed form, allowing more images to be stored in a given amount of space. The sequences of images and sound are generally related in time much like the tracks of a multiple track type recording. For example, the storage may provide multiple logical connections including one or more for picture information 64, one or more for sound information 66, and one or more for composition information 68.

Referring to FIGS. 1 and 2, in composing material, the user interacts with the workstation portion of the system 10. Composition operations may include editing operations, special effects generation, dubbing operations, or the like. The composition to be worked on is displayed in an outline format in the timeline display. This outline format may include waveforms for sound information, or a series of representative pictures for image information such as video or film sequences. If a user desires to perform a composing operation on a particular scene he, or she may move the pointer 34 on the screen using the mouse and click on the portion of the timeline which shows the representative scene indicating the location at which the edit is to be performed. This is a relatively rough operation as computer displays will generally only allow display of a relatively low number of images on a timeline at a meaningful size. Once the user has located a rough location for the edit using the timeline position indicator, he or she may perform more precise jog and shuttle operations. To do so, the operator may use the pointing device to click on the on-screen controls 26 or may press a key 21 on the keyboard 20. This operation puts the workstation in shuttle mode. In this mode, when the user moves the mouse to the left, the workstation begins moving through the stored sequence of images at a rate determined by the distance through which the user has moved the mouse. This corresponds to a reverse shuttle operation, which may analogized to scan rewinding a video tape at a variable rate, with the rate dependent on the mouse displacement. Conversely, moving the mouse to the right will cause the sequence of images to be moved through in a forward direction in a forward shuttle operation.

The system 40 performs this shuttle operation by first obtaining position information from the pointing device through the data path 52. This operation may be performed by directly accessing the hardware associated with the pointing device, or by retrieving a coordinate stored by the computer's operating system. This mouse position information is then translated by the mouse/scrub control module into direction and magnitude information, which is transferred to the player module.

The magnitude information may be represented by the X-coordinate of the current position of the mouse subtracted from the X-coordinate of the position of the mouse when the mode was entered, with this difference being multiplied by a scaling constant. The sign of this difference may be used as the direction information. The value of the constant will determine how sensitive the shuttle operation will be.

The direction and magnitude information can be transformed in this operation into numerical values/which can be directly applied to the player module as commands. The direction information represents the direction of playback for the player module, and the magnitude information represents the speed of playback. These relayed commands directly cause the player module to display the sequences of images and/or sounds on the display at the appropriate rate.

In the shuttle mode, the system limits the maximum forward or reverse speed to three-times the sound speed (the sound speed is the speed at which a video sequence is played where the sound is played at the proper speed). This speed limiting feature prevents the user from getting lost by moving the mouse at a high rate of speed, such as by accidentally knocking the mouse across the desk.

Furthermore, in shuttle mode, "inertia" is added to the operation of the control. Rather than supplying information about mouse position changes directly to the player, changes in mouse position are moderated over a short period. In one embodiment this is done by responding to changes in mouse position by providing a smaller corresponding change in speed to the player module and gradually increasing that change in speed to the full change in speed indicated by the mouse. For example, if the user were to double the distance of the mouse from its starting position, the mouse scrub control module might convey a 50% increase to the player module, followed closely by a 75% increase, and then a 90% increase, and finally a 100% increase. It has been found that this inertia enhances the ease of use and efficiency of use of the apparatus.

In shuttle mode, the system also has a small threshold value below which no shuttle operation takes place. This prevents the player from playing back at extremely slow speeds which are of little use and are sometimes found to be uncomfortable to the user. Values on the order of a 1% threshold have been found to be satisfactory.

The user may also use a jog mode for the workstation. Jog mode is similarly controlled by the position of the mouse, but advances from still frame to still frame within the sequence of images, rather than adjusting the speed of playback of the images. In jog mode, the distance the mouse travels from its starting point relates to the offset within the sequence of frames between the current position and the position to be displayed.

To enter jog mode from shuttle mode, the user may simply press and hold the mouse button 32. This stops the action in the display window and subsequent motion of the mouse will constitute jogging operations. Other methods for entering the jogging mode are possible, such as keyboard keys 21. Similarly, the user may exit the jog mode by one of these methods, or by double clicking on the mouse button 32. Releasing the mouse button while in jog mode will return the user to shuttle mode, and with the current mouse position as the starting position at zero play speed.

In the jog mode, the mouse scrub control module receives position information from the pointing device and translates it into a different kind of direction and magnitude information. The mouse scrub control module constantly monitors the mouse and performs velocity calculations based on the position information of the mouse over time. The resulting velocity information may be supplied directly to the player module, after it is adjusted by a constant. By making the speed of the player proportional to that of the mouse, the player module will track the mouse position.

Inertia may also be added to the jog operations in a manner similar to that disclosed above in connection with the shuttle mode. This is particularly useful in connection with sound information, as it makes sound playback more regular during a jog operation.

It is noted that the timeline moves during both jog and shuttle operation and that this provides feedback to the user in these operations. This feedback enhances the ease of use of the workstation operations and prevents the user from getting lost. Also, the user or system designer may adjust the constants determining the sensitivity of the jog and shuttle controls and the inertia, threshold and maximum speeds in the shuttle mode. This allows the user or designer to customize the "feel" of the workstation.

Figure 6:
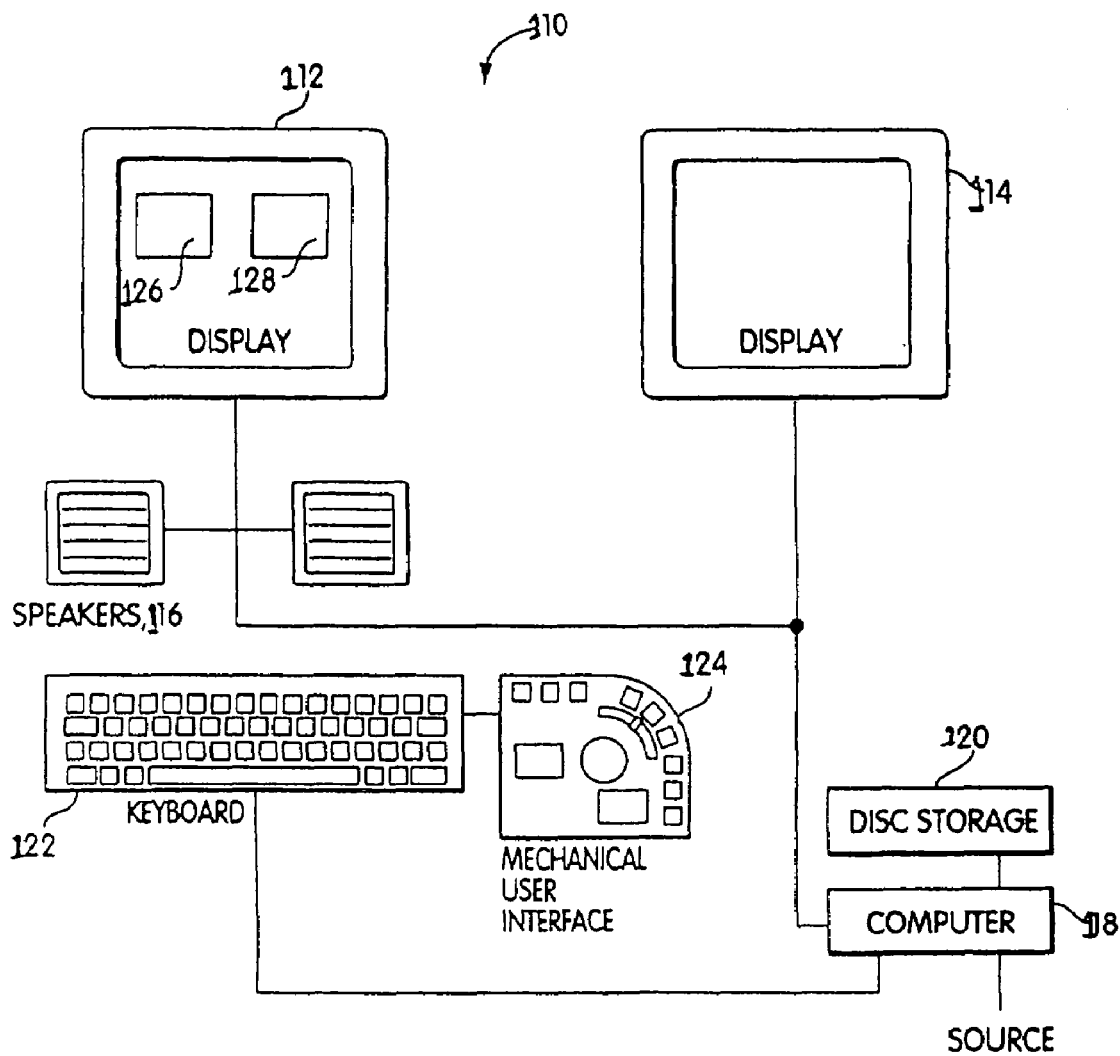
FIG. 6 is a schematic diagram of another media composition system.

With reference to FIG. 6 another media composition system 110 includes a pair of CRT displays 112 and 114 and an audio output device 116 which may include two speakers. The video displays 112 and 114 and the audio transducer 116 are controlled by a computer 118. It is preferred that the computer 118 be a Macintosh from Apple Computer Corporation designated as $II_x$, $II_{ci}$, $II_{fx}$ or Quadra 900. Disk storage apparatus 120 communicates with the computer 118. Disk storage 120 includes one to seven disks for media storage. The disks may be optical or magnetic. The system 110 is controlled by a keyboard 122 and a mechanical user interface 124 to be described in more detail herein.

In operation, video and audio source material is received by the system 110, digitized and stored in the disk storage device 120. The computer 118 is programmed so that the digitized source material may be edited and displayed on one of the video display devices such as the CRT display 112. Typically digitized source material would be displayed at a location 126 and edited material at a location 128 on the display 112.

Figure 7:
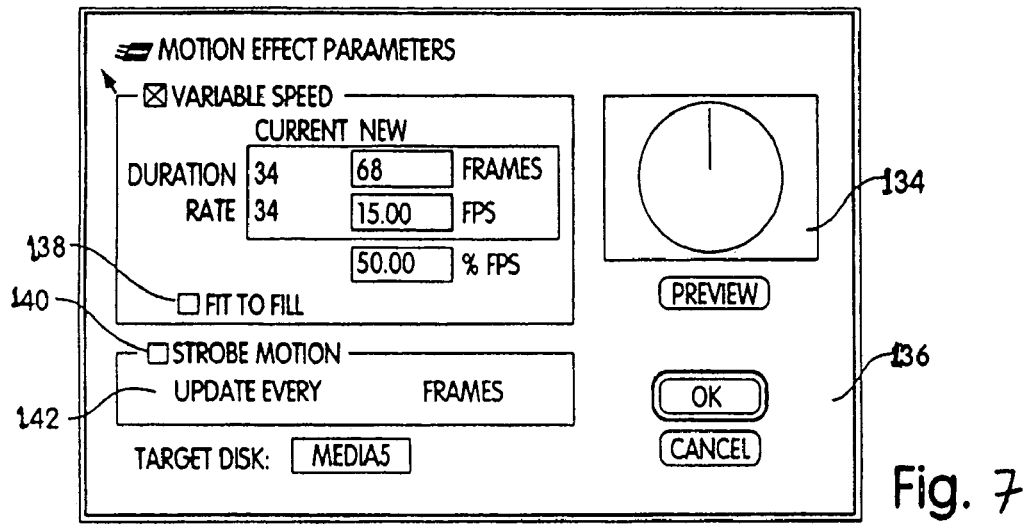
FIG. 7 is a schematic view of the motion effects screen.

The improved media composition system of the invention allows the user to pre-visualize motion effects by creating clips and media files which display the requested effect. The new clip can be used like any other chip—it can be trimmed, extracted, overwritten, used in dissolves and wipes, etc.—and its media can be manipulated as any other, that is, it can be deleted, consolidated, and even back digitized. The new motion effect clips are video only. The start time code is zero hour regardless of the time code of the original clip. Motion effects can be created from master clips and subclips, but not from other motion effect clips. There is a delay as the media composition system creates new media files. Motion effects are organized into three related features: variable speed, fit-to-fill, and strobe motion. These features are accessed through a single command in a source menu. A Motion Effects command opens a dialog box illustrated in FIG. 7. A preview dial 134 allows the operator to pre-visualize the effect even before the OK function 136 is clicked on. The dial 134 normally rotates at one revolution per second. When the operator enters values for an effect and clicks on PREVIEW, the dial rotates at the new appropriate speed. In this way, the preview dial works as a metronome to give the operator a feel for the pace or rhythm of the effect.

Forward and reverse variable speed effects will now be discussed. First of all, the operator opens a clip in the source monitor 112 and marks an IN and an OUT, and chooses motion effects from the monitor 114 command menu. The operator then enters any one of three parameters: duration, play rate (in fps), or percent speed. When any one of these parameters is entered, the media composition system immediately calculates and displays the values for the other two parameters. For example, if one marks a one second piece and enter 50% fps, the media composition system will immediately show two seconds as the duration and 15 fps as the play rate of the new clip. One specifies reverse motion by entering an negative rate or percent speed. When the operator clicks on OK, the media composition system creates a new clip and video/media file for the appropriate effect and loads this clip into the source monitor 112. It should be noted that when the operator asks for slow motion, the media composition system creates a clip in which each frame is duplicated a proportionate number of times. Similarly, when one asks the media composition system for fast motion, it creates a clip in which some portion of the source frames have been deleted. When these clips are played, the motion may appear jerky since the media composition system is not synthesizing a smoothed series of frames. This effect is especially likely with material transferred from film.

The fit-to-fill option allows one to have the media composition system calculate the motion effect required to fill a specific duration in a sequence with a specific duration from the source. The fit-to-fill check box 138 is bold only when the operator has marked an IN and OUT in both monitors 126 and 128 or the four marks are implied by the location of the position control. Given these values for the source (current) and target (new) durations, the media composition system calculates the necessary rate in percent speed of the motion effect. One may accept these or enter one's own values. Once the media composition system has created a new clip, one can overwrite or splice it into the sequence.

Strobe motion is a type of motion effect in which one frame is held for a specific duration and then the next for the same duration and so on. When one opens a clip in the source monitor, mark an IN and an OUT, and select strobe motion 140 in the motion effects dialog box. The operator must fill in the n in "update every n frames" 142. The new clip will have the same duration as the current one but only every nth frame is displayed. A Remake Effects command recreates dissolve media files and includes all motion effects. As with transition effects it is only possible to recreate motion effect media files when the original source media is online. When the operator batch digitizes a sequence which includes motion effects, the effects are automatically recreated at the end of the process. Motion effects are represented correctly in all supported edit decision list (EDL) formats with the following caveat: It may not be possible to express accurately the media composition system motion effect in an EDL because the format may limit the precision with which percent speed can be expressed to whole numbers or one decimal place and the media composition system is not likewise limited. In this case, the media composition system appropriately truncates the rate or percent speed in the EDL and generates a comment which indicates the true rate or percent speed. With the exception of freeze flames, motion effects are ignored by auto-assembly. Auto-assembly edits video from an original clip at 30 frames per second, starting at the edit inpoint and filling the duration of the effect.

Figure 8A:
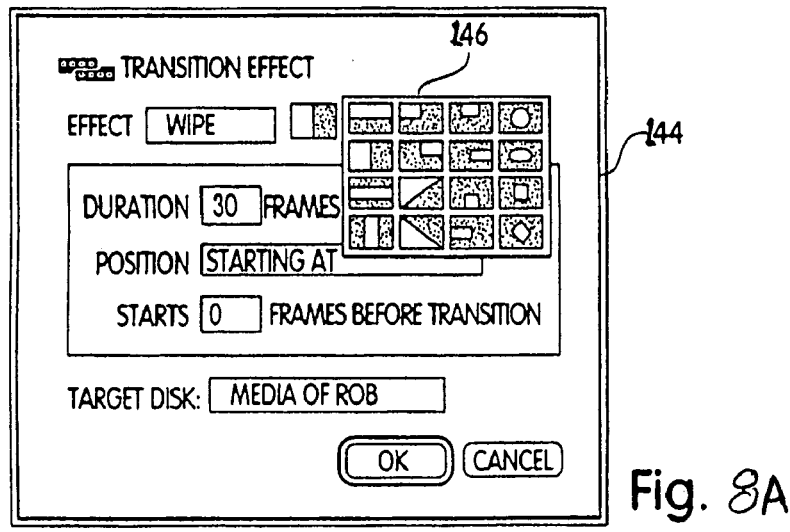
FIGS. 8*a* and 8*b* are schematic illustrations of the transition effects screen.
Figure 8B:
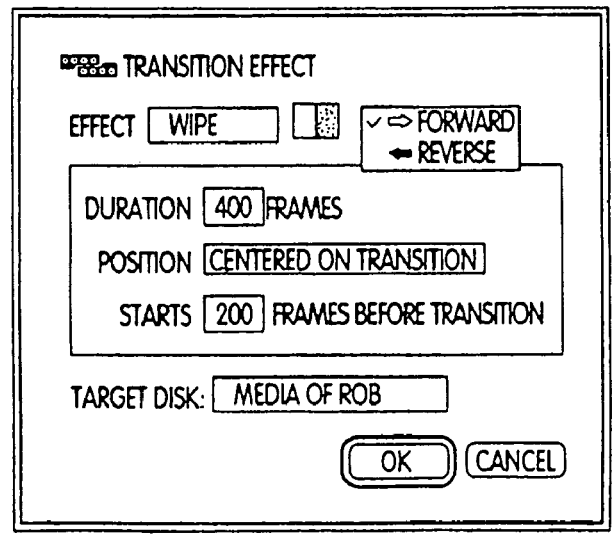

The media composition system of the invention offers wipes as a transition effect. Wipes are accessed through a Transition Effect command. This command opens a dialog box 144 (FIG. 8*a*) which allows the user to choose in a pop-up menu between the two transition effects: dissolve and wipe. When wipe is selected, the operator can choose a pattern from a menu of sixteen choices 146 (displayed graphically) and a direction—forward or reverse as shown in FIG. 8*b*. Forward means that the outgoing clip is represented by the white in the pattern from the menu 146 and the incoming by the black (actually blue). Reverse means the incoming is represented by the white. Regardless of whether the operator chooses dissolve or wipe, the duration must be entered in frames, its start relative to the transition (starting, centered, ending, or offset) and a target drive for the media files.

The effect can be viewed only after the media composition system creates a media file for the specified wipe or dissolve. These effect files will be created, deleted, and recreated in exactly the same way dissolve media files have been in earlier versions. The Remake Effects command includes all transition effects. As with motion effects, it is only possible to recreate transition effect media files when the original source media is online. For example, media for both the incoming and outgoing clip must be online for the media composition system to recreate the dissolve between them. When a sequence which includes transition effects is digitized, the effects are automatically recreated at the end of the process. All wipes are expressed correctly in all EDL formats. A dialog box from the EDL Tool allows one to specify the appropriate pattern number for each wipe pattern. The table of numbers and patterns is stored in a file which can be moved from one media composition system to another. It is not, however, possible to save and choose among several different sets of values. The present media composition system will also allow the operator to zoom to full-screen mode from any monitor (source, record, pop-up) by pressing the quote key. All keyboard equivalents function in full-screen mode. The one exception is that one cannot use Trim Mode while in full-screen play.

The media composition system of the present invention allows the operator to enter a mode in which a mouse controller can be used as a shuttle control. Hit L to shuttle forward, Play (the 5 and Back Quote Keys) to shuttle at 30 fps, K (or click a mouse button) to pause (zero speed), J to shuttle backward, and the Space Bar to exit the Shuttle Mode. Hit L twice to shuttle at 60 fps, thrice to shuttle at 90 fps. Hit J twice for −60 and thrice for −90. While shuttling at zero speed, either full-screen or normal, many of the keyboard functions are active. It is possible to step through the program, clear marks, use both kinds of audio scrub (see below), go to the next or previous edit, show safe titles, etc. If the media composition system cannot do the function and remain in Shuttle Mode, the mode is dropped and the function performed. Toggling between source and record is an example of such an operation. In one embodiment of the present invention, jog shuttling may be performed, with a result which is similar to that obtained using mechanical jog shuttle controls in connection with video tape recorders. With digitized images being played, a mouse or similar input device can provide control for jog shuttling. Jog mode begins when an operator pressed a button. While the button is depressed, movement of the mouse in one direction or another determines the speed of shuttling, or of playback. That is, the position of the mouse when the button is depressed is used as a reference position. With a relationship defined between position and playing speed, the further the operator moves the mouse from the reference position, the faster video is played back in a given direction. For example, movement of the mouse to the right increases the forward playing speed. If the mouse is returned to the reference position, playing stops. As the mouse is moved to the left, the reverse playing speed increases.

An important aspect of the present media composition system is a pitch change audio scrub feature. When the operator shuttles through footage, smooth, continuous audio will be produced at the corresponding speed. That is, pitch will vary with the speed as with an analog tape. This feature is available for one track only. Designate the track for smooth scrub by option clicking (or double clicking) on the speaker icon for that track. The icon becomes an outline. Smooth scrub is available whenever the operator is shuttling, using either the mouse or the shuttle control (beneath the Play button on a keyboard discussed below) to determine the shuttle speed.

Figure 9:
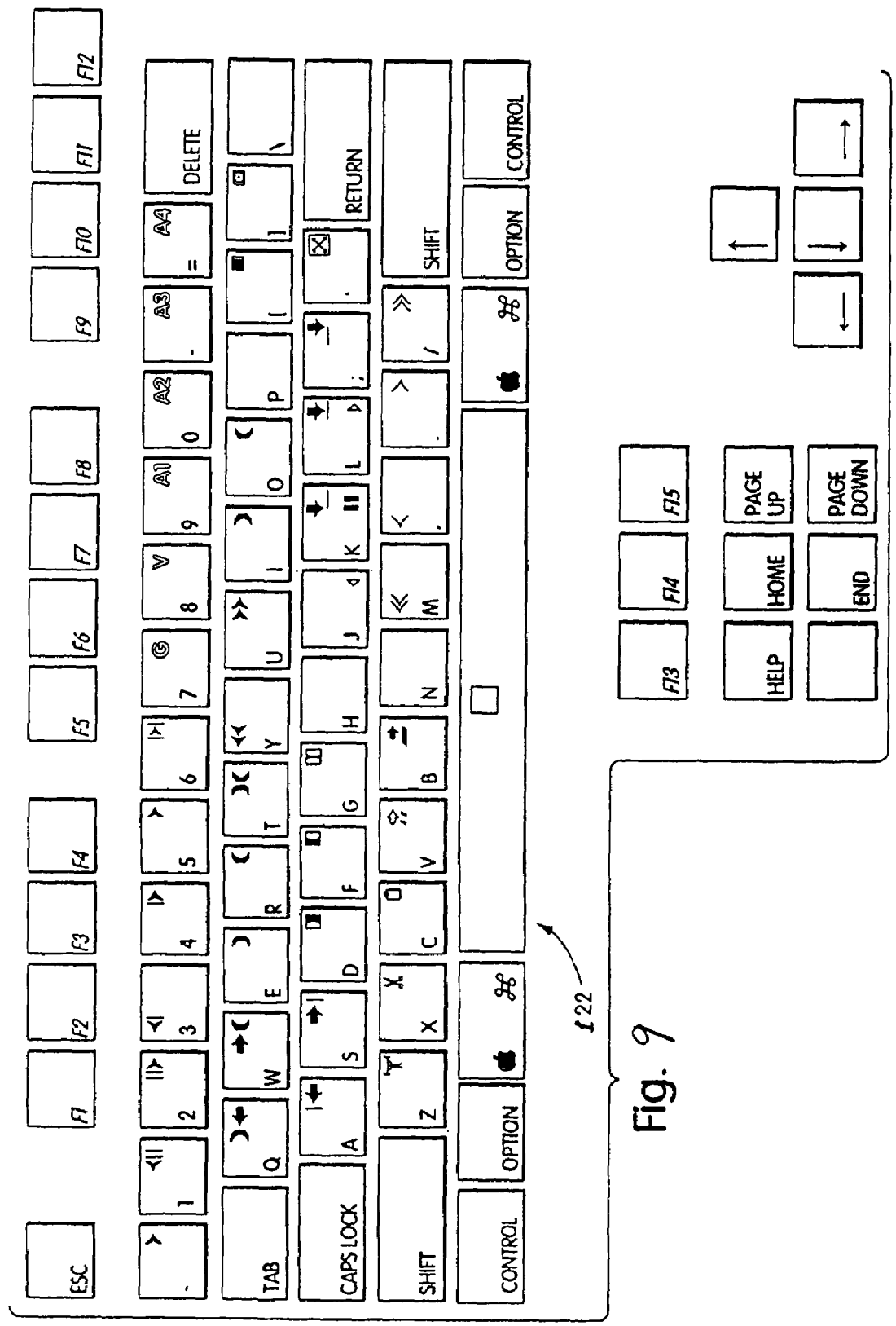
FIG. 9 is an illustration of a keyboard layout.
Figure 10:
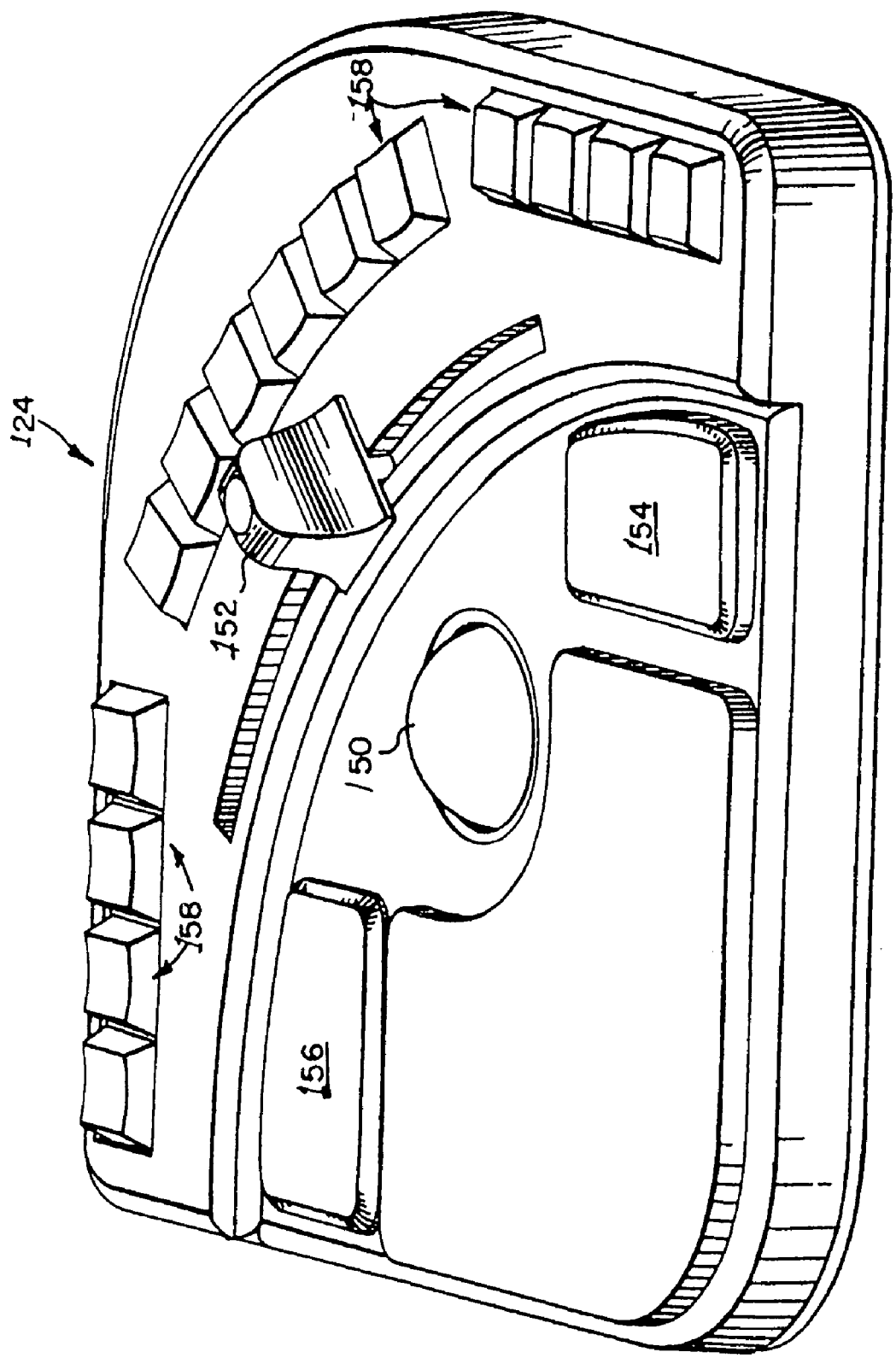
FIG. 10 is a perspective view of the mechanical user interface according to the invention.

Keyboard layout is shown in FIG. 9 and the function of the keys is set forth in Table 1. The keyboard 122 is augmented by the mechanical user interface 124. The mechanical user interface 124 is shown in more detail in FIG. 10. The interface 124 includes a track ball 150 and a speed controller 152. As with a mouse, the track ball 150 may be used to locate a cursor on the monitors. Buttons 154 and 156 serve functions like those provided by the click button on a mouse. It is preferred that the speed control 152 have detents for zero speed normal forward speed (30 frames per second) and a reverse normal speed. It is also preferred that the speed control 152 be spring loaded to return to the zero speed position. It is contemplated that additional buttons 158 be provided so that a user may program their functionality.

TABLE 1

| Function | USB (y/n) | Keyboard Equivalent | Notes |
| --- | --- | --- | --- |
| 1-Frame Back | | 3 | motion control button |
| 1-Frame Forward | | 4 | motion control button |
| 10-Frame Back | | 1 | motion control button |
| 10-Frame Forward | | 2 | motion control button |

TABLE 1-continued

| Function | USB (y/n) | Keyboard Equivalent | Notes |
|---|---|---|---|
| A1 track on/off | | 9 | track selector |
| A2 track on/off | | 0 | track selector |
| A3 track on/off | | - | track selector |
| A4 track on/off | | = | track selector |
| activate source/record monitor | | ESCAPE | moved from * on numeric keypad |
| All Stop | | SPACE BAR | |
| Clear IN | Y | D | |
| Clear OUT | Y | F | |
| Clear Marks | Y | G | |
| Copy to Clipboard | Y | C | |
| Exit Mouse Shuttle | | SPACE BAR | |
| Extract | Y | X | |
| Fast Forward | | U | deck control function |
| Find Frame | Y | [ | |
| Full Screen on/off | | ' | mode toggle |
| Go to IN | Y | Q | |
| Go to OUT | Y | W | |
| Go to Prev Edit | Y | A | |
| Goto Next Edit | Y | S | |
| Graphics track on/off | | 7 | track selector |
| Lift | Y | Z | |
| Mark Clip | Y | T | |
| Mark IN | Y | E, I | two equivalents for convenience |
| Mark OUT | Y | R, O | two equivalents for convenience |
| Minus 10 Frames | | M | Trim Mode function—trim buttons |
| Minus 1 Frame | | < | Trim Mode function—trim buttons |
| Overwrite | Y | B | |
| Pause | | K | except in Trim Mode; mouse shuttle and deck control function |
| Play | | 5. | moved from Tab. The big Play button can be configured as Play IN to OUT or Shuttle Forward |
| Play IN to OUT | Y | 6 | see Play |
| Plus 1 Frame | | > | Trim Mode function—trim buttons |
| Plus 10 Frames | | / | Trim Mode function—trim buttons |
| Rewind | | Y | deck control function |
| Safe Title/Action | Y | ] | |
| Shuttle Back | | J | mouse shuttle and deck control function |
| Shuttle Forward | | L | except in Trim Mode; mouse shuttle and deck control function |
| Slip Left (1 frame) | Y | < | except in Trim Mode |
| Slip Left (10 frames) | | M | except in Trim Mode |
| Slip Right (1 frame) | Y | > | except in Trim Mode |
| Slip Right (10 frames) | | ? | except in Trim Mode |
| Splice | Y | V | |
| Trim Both | | L | only in Trim Mode |
| Trim Incoming | | ; | only in Trim Mode |
| Trim Outgoing | | K | only in Trim Mode |
| Video track on/off | | 8 | track selector |
| Delete Clip/Sequence (from a bin) | | DELETE | opens delete dialog box from Bin menu |

Yet another aspect of the improved media composition system is sync point editing which allows the operator to specify a position in one monitor that is desired to be in sync with the position in the other monitor. The operator then performs an overwrite that preserves that sync relationship. Sync point editing (SPE) is accessed using the SPE command in the media composition system menu. Sync point editing is performed in three steps. First, a point is specified in the destination, or record, clip, for example by placing a mouse cursor on the displayed frame of the clip and pressing the mouse button. The location within the clip is then stored. Second, a point in the source material is identified in a similar manner. Third, the size of the source information is specified, for example, by using IN and OUT markers. These steps may, in fact, be performed in any order, which may be defined by the programmer of the computer. After these three steps are completed, the source information is overwritten in the destination, or record, information, by placing the identified source location at the specified destination location. Such sync point editing may be performed with any combination of audio and video clips. Typically, it is performed to synchronize recorded sound to an event in a video clip. The operator may then turn PHANTOM marks on in the media composition system window to see how the PHANTOM marks behave in relation to the position control in the record monitor 128. With SPE off, the system uses the current position as the IN; with SPE on, the current position is the sync point. It should be noted that one can mark the IN and OUT in the record monitor 128 instead of the source monitor 126.

Another aspect of the invention is slip-sync editing. This kind of editing typically refers to maintaining synchronization between a series of video clips and corresponding audio clips when transitions between clips are trimmed. In prior art systems, when an audio clip was trimmed, i.e., made shorter, subsequent clips became out of synchronization with their corresponding video clips. In the present system, when audio material is removed from one end of an audio segment from a clip, source material from the original audio clip is added to the other end of the segment so as to maintain the length of the audio segment. The source material can readily be retrieved from the memory location or disk on which it is stored. Thus, the synchronization of subsequent clips is maintained.

While there have been shown and described what are at present considered the preferred embodiments of the present invention, it will be obvious to those skilled in the art that various changes and modifications may be made therein without departing from the scope of the invention as defined by the appended claims.

What is claimed is:

1. A video editing system, comprising:
   a random access computer readable medium for storing video information in one or more data files in a computer file system;
   a display;
   a standard alphanumeric keyboard;
   computing apparatus operative in response to user input to perform editing operations on the video information, and operative in response to user input to display video information from the one or more data files in a source video window in the display, and operative in response to user input to display results of the editing operations on the video information in an edited program window on the display, and operative in response to a signal from a key on the standard alphanumeric keyboard to select one of the source video window and edited video window for display, and operative in response to signals from a set of three keys located right next to each other on one horizontal row in the standard alphanumeric keyboard to control shuttling of playback of the video information from the one or more data files in the selected window at a shuttle speed and in a shuttle direction, such that a first of the three keys is for forward shuttling, a second of the three keys is for pausing, a third of the three keys is for reverse shuttling, and wherein:

the second key is right between the first and third keys,
a first actuation of the first key in a paused condition causes images of the video material to be presented to the user at a first forward shuttle speed,
a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed,
a first actuation of the third key in the paused condition causes images of the video material to be presented to the user at a predetermined first reverse shuttle speed,
a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and
a first actuation of the second key after the first or second actuations of the first key or after the first or second actuations of the third key causes the video material to be paused.

2. The video editing system of claim 1, wherein the change in the shuttle speed is in increments corresponding to a frame per second rate of the source.

3. The video editing system of claim 2, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

4. The video editing system of claim 3, wherein the third key also bears a label indicative of a reverse shuttling function, wherein the second key also bears a label indicative of a pause function and wherein the first key also bears a label indicative of a forward shuttling function.

5. The video editing system of claim 1, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

6. The video editing system of claim 5, wherein the third key also bears a label indicative of a reverse shuttling function, wherein the second key also bears a label indicative of a pause function and wherein the first key also bears a label indicative of a forward shuttling function.

7. A computer system for playing motion video, comprising:
a random access computer readable medium for storing video information in one or more data files in a computer file system;
a display;
a standard alphanumeric keyboard; and
computing apparatus operative in response to signals from a set of three keys located right next to each other on one horizontal row in the standard alphanumeric keyboard to control shuttling of playback of the video information from the one or more data files on the display at a shuttle speed and in a shuttle direction, such that a first of the three keys is for forward shuttling, a second of the three keys is for pausing, a third of the three keys is for reverse shuttling, and wherein:
the second key is right between the first and third keys,
a first actuation of the first key in a paused condition causes images of the video material to be presented to the user at a first forward shuttle speed,
a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed,
a first actuation of the third key in the paused condition causes images of the video material to be presented to the user at a predetermined first reverse shuttle speed,
a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and
a first actuation of the second key after the first or second actuations of the first key or after the first or second actuations of the third key causes the video material to be paused.

8. The computer system of claim 7, wherein the change in the shuttle speed is in increments corresponding to a frame per second rate of the video information.

9. The computer system of claim 8, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

10. The computer system of claim 9, wherein the third key also bears a label indicative of a reverse shuttling function, wherein the second key also bears a label indicative of a pause function and wherein the first key also bears a label indicative of a forward shuttling function.

11. The computer system of claim 7, wherein the standard alphanumeric keyboard has 36 alphanumeric keys disposed in a standard keyboard layout, and wherein the first of the three keys is a key that corresponds to an "L" key in a QWERTY keyboard layout the second of the three keys is a key that corresponds to a "K" key in a QWERTY keyboard layout and the third of the three keys is a key that corresponds to a "J" key in a QWERTY keyboard layout.

12. The computer system of claim 11, wherein the third key also bears a label indicative of a reverse shuttling function, wherein the second key also bears a label indicative of a pause function and wherein the first key also bears a label indicative of a forward shuttling function.

13. A video editing system, comprising:
a random access computer readable medium for storing video information in one or more data files in a computer file system;
a display;
a standard alphanumeric keyboard; and
computing apparatus operative in response to user input to perform editing operations on the video information, and operative in response to user input to display video information from the one or more data files on the display, and operative in response to signals from a set of three keys located right next to each other on one horizontal row in the standard alphanumeric keyboard to control shuttling of playback of the video information from the one or more data files on the display at a shuttle speed and in a shuttle direction, such that a first of the three keys is for forward shuttling, a second of the three keys is for pausing, a third of the three keys is for reverse shuttling, and wherein:

the second key is right between the first and third keys, a first actuation of the first key in a paused condition causes images of the video material to be presented to the user at a first forward shuttle speed, a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed, a first actuation of the third key in the paused condition causes images of the video material to be presented to the user at a predetermined first reverse shuttle speed, a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and a first actuation of the second key after the first or second actuations of the first key or after the first or second actuations of the third key causes the video material to be paused.

14. The video editing system of claim 13, wherein the change in the shuttle speed is in increments corresponding to a frame per second rate of the video information.

15. The video editing system of claim 14, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

16. The video editing system of claim 15, wherein the third key also bears a label indicative of a reverse shuttling function, wherein the second key also bears a label indicative of a pause function and wherein the first key also bears a label indicative of a forward shuttling function.

17. The video editing system of claim 13, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

18. The video editing system of claim 17, wherein the third key also bears a label indicative of a reverse shuttling function, wherein the second key also bears a label indicative of a pause function and wherein the first key also bears a label indicative of a forward shuttling function.

19. A computer program product for editing video information on a computer having a standard alphanumeric keyboard, comprising:

a computer readable medium for storing computer program code executable by the computer, wherein the computer program code comprises:

editing code that when executed is responsive to user input to perform editing operations on video information in one or more data files accessible by the computer;

display code that when executed is responsive to user input to display the video information from the one or more data files on a display accessible by the computer, and control code that when executed is responsive to signals from a set of three keys located right next to each other on one horizontal row in the standard alphanumeric keyboard to control shuttling of playback of the video information from the one or more data files on the display at a shuttle speed and in a shuttle direction, such that a first of the three keys is for forward shuttling, a second of the three keys is for pausing, a third of the three keys is for reverse shuttling, and wherein:

the second key is right between the first and third keys, a first actuation of the first key in a paused condition causes images of the video material to be presented to the user at a first forward shuttle speed, a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed, a first actuation of the third key in the paused condition causes images of the video material to be presented to the user at a predetermined first reverse shuttle speed, a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and a first actuation of the second key after the first or second actuations of the first key or after the first or second actuations of the third key causes the video material to be paused.

20. The computer program product of claim 19, wherein the change in the shuttle speed is in increments corresponding to a frame per second rate of the video information.

21. The computer program product of claim 20, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

22. The computer program product of claim 21, wherein the third key also bears a label indicative of a reverse shuttling function, wherein the second key also bears a label indicative of a pause function and wherein the first key also bears a label indicative of a forward shuttling function.

23. The computer program product of claim 19, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

24. The computer program product of claim 23, wherein the third key also bears a label indicative of a reverse shuttling function, wherein the second key also bears a label indicative of a pause function and wherein the first key also bears a label indicative of a forward shuttling function.

25. A computer program product for playing video information on a computer having a standard alphanumeric keyboard, comprising:
- a computer readable medium for storing computer program code executable by a computer, wherein the computer program code includes:
- display code that when executed is responsive to user input to display video information, from one or more data files accessible by the computer, on a display accessible by the computer; and
- control code that when executed is responsive to signals from a set of three keys located right next to each other on one horizontal row in the standard alphanumeric keyboard to control shuttling of playback of the video information from the one or more data files at a shuttle speed and in a shuttle direction, such that a first of the three keys is for forward shuttling, a second of the three keys is for pausing, a third of the three keys is for reverse shuttling, and wherein:
  - the second key is right between the first and third keys,
  - a first actuation of the first key in a paused condition causes images of the video material to be presented to the user at a first forward shuttle speed,
  - a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed,
  - a first actuation of the third key in the paused condition causes images of the video material to be presented to the user at a predetermined first reverse shuttle speed,
  - a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and
  - a first actuation of the second key after the first or second actuations of the first key or after the first or second actuations of the third key causes the video material to be paused.

26. The computer program product of claim 25, wherein the change in the shuttle speed is in increments corresponding to a frame per second rate of the video information.

27. The computer program product of claim 26, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

28. The computer program product of claim 27, wherein the third key also bears a label indicative of a reverse shuttling function, wherein the second key also bears a label indicative of a pause function and wherein the first key also bears a label indicative of a forward shuttling function.

29. The computer program product of claim 25, wherein the standard alphanumeric keyboard has 36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout.

30. The computer program product of claim 29, wherein the third key also bears a label indicative of a reverse shuttling function, wherein the second key also bears a label indicative of a pause function and wherein the first key also bears a label indicative of a forward shuttling function.

31. An alphanumeric keyboard for use with a computerized video editing system operative in response to signals from a set of three keys located right next to each other on one horizontal row in the alphanumeric keyboard to control shuttling of playback of video information, from one or more data files stored on a random access computer readable medium in a computer file system, on a display at a shuttle speed and in a shuttle direction, such that a first of the three keys is for forward shuttling, a second of the three keys is for pausing, a third of the three keys is for reverse shuttling, and wherein:
- the second key is right between the first and third keys,
- a first actuation of the first key in a paused condition causes images of the video material to be presented to the user at a first forward shuttle speed,
- a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed,
- a first actuation of the third key in the paused condition causes images of the video material to be presented to the user at a predetermined first reverse shuttle speed,
- a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and
- a first actuation of the second key after the first or second actuations of the first key or after the first or second actuations of the third key causes the video material to be paused, the alphanumeric keyboard comprising:

36 alphanumeric keys disposed in a standard keyboard layout, and wherein the first of the three keys is a key that corresponds to an "L" key in a QWERTY keyboard layout, the second of the three keys is a key that corresponds to a "K" key in a QWERTY keyboard layout and the third of the three keys is a key that corresponds to a "J" key in a QWERTY keyboard layout, wherein the second key is between the first and third keys, wherein the third key also bears a label indicative of a reverse shuttling function, wherein the second key also bears a label indicative of a pause function and wherein the first key also bears a label indicative of a forward shuttling function.

32. The alphanumeric keyboard of claim 31, further comprising keys containing typographical symbols, wherein the computerized video editing system further is operative in response to signals from a set of four adjacent keys from the standard alphanumeric keyboard to control trimming of a selected transition in the video information, such that a first of the four keys is for trimming a plurality of frames in a reverse direction, a second of the four keys is for trimming one frame in a reverse direction, a third of the four keys is for trimming one frame in a forward direction, a fourth of the four keys is for trimming a plurality of frames in a forward direction, wherein the first key is a key that corresponds to an "M" key in a QWERTY keyboard layout, the second key is a key that corresponds to a "<" key in a QWERTY keyboard layout, the third key is a key that corresponds to a ">" key in a QWERTY keyboard layout, and the fourth key is a key that corresponds to a "/" key in a QWERTY keyboard layout, and wherein the first key also bears a label indicative of a function for reverse trimming of a plurality of frames, wherein the second key also bears a label indicative of a function for reverse trimming of one frame, wherein the third key also bears a label indicative of a function for forward trimming of one frame, and wherein the fourth key also bears a label indicative of a function for forward trimming of a plurality of frames.

33. The alphanumeric keyboard of claim 32, wherein the computerized video editing system further is operative in response to signals from a set of three adjacent keys from the standard alphanumeric keyboard to select a node of a transition, such that a first of the three keys selects trimming of a clip prior the transition, a second of the three keys selects trimming of clips both before and after the transition, and a third of the three keys selects trimming of a clip after the transition, wherein the first key also bears a label indicative of a function for trimming of a clip prior to the transition, wherein the second key also bears a label indicative of a function for trimming of clips both before and after the transition, wherein the third key also bears a label indicative of a function for trimming of a clip after the transition.

34. An alphanumeric keyboard for use with a computerized video editing system, comprising:
36 alphanumeric keys and additional keys with typographical symbols disposed in a standard keyboard layout, wherein a set of three keys located right next to each other on one horizontal row of keys includes a first key on the user's left bearing a label indicative of a reverse shuttling function, a second, central key bearing a label indicative of a pause function and a third key on the user's right bearing a label indicative of a forward shuttling function, wherein the first of the three keys is an "L" key in a QWERTY keyboard layout, wherein the second of the three keys is a "K" key in a QWERTY keyboard layout and the third of the three keys is a "J" key in a QWERTY keyboard layout.

35. The alphanumeric keyboard of claim 34, wherein a set of four adjacent keys includes a first key bearing a label indicative of a function for reverse trimming of a plurality of frames, a second key bearing a label indicative of a function for reverse trimming of one frame, a third key bearing a label indicative of a function for forward trimming of one frame, and a fourth key bearing a label indicative of a function for forward trimming of a plurality of frames.

36. The alphanumeric keyboard of claim 35, wherein a set of three adjacent keys includes a first key bearing a label indicative of a function for trimming of a clip prior to the transition, a second key bearing a label indicative of a function for trimming of clips both before and after the transition, and a third key bearing a label indicative of a function for trimming of a clip after the transition.

37. A video editing system, comprising:
a random access computer readable medium for storing video information in one or more data files in a computer file system;
a display;
a standard alphanumeric keyboard;
computing apparatus operative in response to user input to perform editing operations on the video information, and operative in response to user input to display video information from the one or more data files on the display, and operative in response to signals from a set of four adjacent keys from the standard alphanumeric keyboard to control trimming of a selected transition in the video information, such that
a single actuation of a first of the four keys causes a plurality of images to be trimmed in a reverse direction,
a single actuation of a second of the four keys causes one image to be trimmed in a reverse direction,
a single actuation of a third of the four keys causes one image to be trimmed in a forward direction, and
a single actuation of a fourth of the four keys causes a plurality of images to be trimmed in a forward direction.

38. The video editing system of claim 37, wherein the first key is a key that corresponds to an "M" key in a QWERTY keyboard layout, the second key is a key that corresponds to a "<" key in a QWERTY keyboard layout, the third key is a key that corresponds to a ">" key in a QWERTY keyboard layout, and the fourth key is a key that corresponds to a "/" key in a QWERTY keyboard layout.

39. The video editing system of claim 38, wherein the first key also bears a label indicative of a function for reverse trimming of a plurality of frames, wherein the second key also bears a label indicative of a function for reverse trimming of one frame, wherein the third key also bears a label indicative of a function for forward trimming of one frame, and wherein the fourth key also bears a label indicative of a function for forward trimming of a plurality of frames.

40. The video editing system of claim 38, wherein the computing apparatus further is operative in response to signals from a set of three adjacent keys from the standard alphanumeric keyboard to select a mode of a transition, such that a first of the three keys selects trimming of a clip prior the transition, a second of the three keys selects trimming of clips both before and after the transition, and a third of the three keys selects trimming of a clip after the transition.

41. The video editing system of claim 37, wherein the computing apparatus further is operative in response to signals from a set of three adjacent keys from the standard alphanumeric keyboard to select a mode of a transition, such that a first of the three keys selects trimming of a clip prior the transition, a second of the three keys selects trimming of clips both before and after the transition, and a third of the three keys selects trimming of a clip after the transition.

42. The video editing system of claim 37, wherein the computing apparatus further is operative in response to signals from a set of four adjacent keys from the standard alphanumeric keyboard to control trimming of a selected transition in the video information, such that a first of the four keys is for trimming a plurality of frames in a reverse direction, a second of the four keys is for trimming one frame in a reverse direction, a third of the four keys is for trimming one frame in a forward direction, a fourth of the four keys is for trimming a plurality of frames in a forward direction.

43. The video editing system of claim 42, wherein the first key is a key that corresponds to an "M" key in a QWERTY keyboard layout, the second key is a key that corresponds to a "<" key in a QWERTY keyboard layout, the third key is a key that corresponds to a ">" key in a QWERTY keyboard layout, and the fourth key is a key that corresponds to a "/" key in a QWERTY keyboard layout.

44. Previously presented) The video editing system of claim 43, wherein the first key also bears a label indicative of a function for reverse trimming of a plurality of frames, wherein the second key also bears a label indicative of a function for reverse trimming of one frame, wherein the third key also bears a label indicative of a function for forward trimming of one frame, and wherein the fourth key also bears a label indicative of a function for forward trimming of a plurality of frames.

45. The video editing system of claim 43, wherein the computing apparatus further is operative in response to signals from a set of three adjacent keys from the standard alphanumeric keyboard to select a mode of a transition, such that a first of the three keys selects trimming of a clip prior the transition, a second of the three keys selects trimming of clips both before and after the transition, and a third of the three keys selects trimming of a clip after the transition.

46. The video editing system of claim 45, wherein the first key also bears a label indicative of a function for trimming of a clip prior to the transition, wherein the second key also bears a label indicative of a function for trimming of clips both before and after the transition, wherein the third key also bears a label indicative of a function for trimming of a clip after the transition.

47. The video editing system of claim 42, wherein the computing apparatus further is operative in response to signals from a set of three adjacent keys from the standard alphanumeric keyboard to select a mode of a transition, such that a first of the three keys selects trimming of a clip prior the transition, a second of the three keys selects trimming of clips both before and after the transition, and a third of the three keys selects trimming of a clip after the transition.

48. The video editing system of claim 47, wherein the first key also bears a label indicative of a function for trimming of a clip prior to the transition, wherein the second key also bears a label indicative of a function for trimming of clips both before and after the transition, wherein the third key also bears a label indicative of a function for trimming of a clip after the transition.

49. A computer system for playing motion video comprising computing apparatus operative in response to signals from a set of three keys located right next to each other on one horizontal row in a standard alphanumeric keyboard to control shuttling of playback of video information, stored in one or more data files on a random access computer readable medium in a computer file system, on a display at a shuttle speed and in a shuttle direction, such that a first of the three keys is for forward shuttling, a second of the three keys is for pausing, a third of the three keys is for reverse shuttling, and wherein:

the second key is right between the first and third keys, a first actuation of the first key in a paused condition causes images of the video material to be presented to the user at a first forward shuttle speed, a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed, a first actuation of the third key in the paused condition causes images of the video material to be presented to the user at a predetermined first reverse shuttle speed, a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and a first actuation of the second key after the first or second actuations of the first key or after the first or second actuations of the third key causes the video material to be paused.

50. The computer system of claim 49, wherein the change in the shuttle speed is in increments corresponding to a frame per second rate of the video information.

51. A video editing system comprising computing apparatus operative in response to user input to perform editing operations on video information, stored in one or more data files on a random access computer readable medium in a computer file system, and operative in response to user input to display the video information on a display, and operative in response to signals from a set of three keys located right next to each other on one horizontal row in a standard alphanumeric keyboard to control shuttling of playback of the video information on the display at a shuttle speed and in a shuttle direction, such that a first of the three keys is for forward shuttling, a second of the three keys is for pausing, a third of the three keys is for reverse shuttling, and wherein:

the second key is right between the first and third keys, a first actuation of the first key in a paused condition causes images of the video material to be presented to the user at a first forward shuttle speed, a second actuation of the first key, after the first actuation of the first key and while images of the video material are presented to the user at a first forward shuttle speed, causes a change in forward shuttle speed from the first forward shuttle speed to a predetermined second forward shuttle speed the is faster than the first forward shuttle speed, a first actuation of the third key in the paused condition causes images of the video material to be presented to the user at a predetermined first reverse shuttle speed, a second actuation of the third key, after the first actuation of the third key and while images of the video material are presented to the user at a first reverse shuttle speed, causes a change in reverse shuttle speed from the first reverse shuttle speed to a predetermined second reverse shuttle speed that is faster than the first reverse shuttle speed, and a first actuation of the second key after the first or second actuations of the first key or after the first or second actuations of the third key causes the video material to be paused.

52. The video editing system of claim 51, wherein the change in the shuttle speed is in increments corresponding to a frame per second rate of the video information.

* * * * *